Nov. 14, 1961 W. A. HAINE ET AL 3,008,862
EXTRUDED BEAD SEALING
Filed June 29, 1956 2 Sheets-Sheet 1
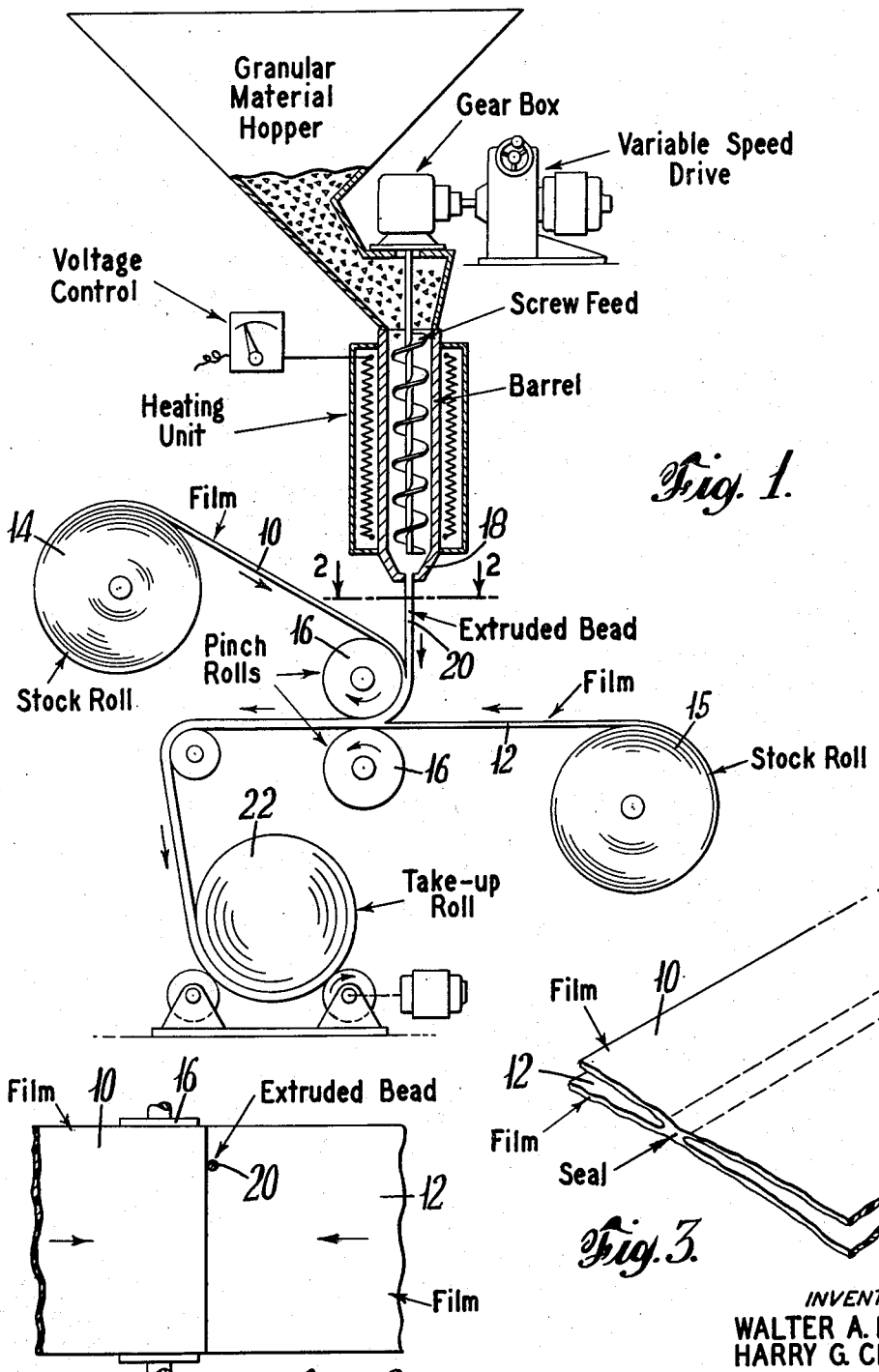
INVENTORS
WALTER A. HAINE
HARRY G. CHINN
BY Richard S Shreve Jr
ATTORNEY

INVENTORS
WALTER A. HAINE
HARRY G. CHINN

ATTORNEY

United States Patent Office 3,008,862
Patented Nov. 14, 1961

3,008,862
EXTRUDED BEAD SEALING
Walter A. Haine, Scotch Plains, and Harry G. Chinn, Somerville, N.J., assignors to Union Carbide Corporation, a corporation of New York
Filed June 29, 1956, Ser. No. 594,929
7 Claims. (Cl. 156—244)

This invention relates to hot continuous bead sealing, and more particularly to method and apparatus for utilizing thermoplastic bead of this character for bonding together sections of film or sheet to provide a strong, continuous, separation-resistant seal. Such seals are used to effect bag closure, to form bags and tubes, to provide large sections such as are used for swimming pool liners, rain catch-basin liners, hay-rick covers, tarpaulins and in many other applications requiring thermoplastic sections too large to be produced economically on commercial film and sheet forming equipment. In bag-sealing, bag-forming, tube-forming and similar applications, it is also advantageous, sometimes even essential, that the sealing, or seaming, process be continuous and operable at high speeds.

One method heretofore proposed for this purpose has been conductive heat sealing. In this method the thermoplastic sections to be joined are overlapped and pressed together while heat is applied to one or both of the external faces by means of heating bars or wheels. The heat permeates the thermoplastic until the interface becomes hot enough to flux and fuse together. The method has limitations in that very thin films are too readily subject to thermally induced distortion and to a weakening caused by mechanical damage inflicted by the edge of the sealing bar or wheel. Thicker sections require progressively longer dwell times to enable the heat to penetrate through the poor conductor thermoplastic to the interface. Beyond a certain thickness, depending on the particular material involved, the dwell time becomes so great as to make the method commercially impractical because the sealing rate becomes prohibitively low.

Another proposed method has been electronic heat sealing. In this method overlapped sections are compressed between two electrode bars or passed between clamp-on electrode wheels and a high frequency current is passed through the material. A portion of the electrical energy is dissipated as, i.e., converted to, heat within the material, and serves to flux and fuse the plies together. The method is inoperative, however, for such materials as polystyrene, unplasticized polyvinyl chloride, polyethylene, polymonochlorotrifluoroethylene, polytetrafluoroethylene and other low loss products, that is, those having a loss factor less than about 0.1. In practice, the electrode bars and wheels also have an edge effect. Also, electrode bars are usually kept clamped-on for a few seconds to allow the sealed area to cool somewhat before the pressure is relieved; and this dwell period significantly reduces sealing rates.

A variety of adhesives, cements, and solvents are sometimes used to join thermoplastic sections. While results vary, depending on the particular adhesive composition, thermoplastic and sealing procedure used, the following limitations are generally evident. Operations are messy, costly—because of material and extra compounding costs, and slow—because most adhesives require a setting period of some duration; and the seals are frequently weak and separate easily even under moderate stress. Further, this method is commercially impractical for certain thermoplastic materials, such as polyethylene, polymonochlorotrifluoroethylene, polytetrafluoroethylene and the like, since there are no effective adhesives or solvents suitable for use with such materials.

The main objects of the present invention are to avoid the difficulties referred to above, and to provide improved method and apparatus which is simple and economical in operation and construction, which produces an improved seal and is otherwise well adapted for the purposes set forth.

According to the present invention the new process which provides a homogeneous, strong, separation-resistant seal or seam or weld, comprises feeding a thin, hot bead of thermoplastic material directly between overlapped portions of the film or sheet sections just as said overlapping sections enter the bight between a pair of pinch rolls or an equivalent pressure providing arrangement. The new method provides the following advantages.

Applying the heat directly to the two surfaces which are to be joined eliminates the rate-retarding dwell times, the danger of thermal degradation and the other disadvantages inherently associated with those prior art methods which require driving the heat through a thermoplastic section. Seal formation is virtually instantaneous; and very high web speeds are therefore possible. In fact, the new sealing process can be conducted just about as fast as the film or sheet can be handled by the feed, pressure and rewind assemblies.

The new process is more versatile than any of the old methods in that it can be applied to any extrudable thermoplastic material and can be used to joint sections of, to all intents and purposes, any thickness. Also, seal width and seal thickness can be adjusted over a wide range without any changes in equipment, merely by appropriately adjusting the extrusion rate and web speed.

It is less critical in operation than the old methods. Good quality seals are obtained over a comfortably wide range of extrusion rates and extrusion temperatures. Further, seal quality is not discernibly impaired by variations in web thickness which would be great enough to cause seal discontinuities because of uneven thermal or electrical contact and uneven pressure in the old techniques.

Seal quality and uniformity are improved. The seals are free of discontinuities such as occur in seals prepared by the old sealing methods. Also, the mechanically injurious effects inflicted in the old heat sealing methods by the heating bar and wheel edges are eliminated.

In the old heat sealing methods, particularly conductive heat sealing, the thermoplastic web comes into direct contact with the hot bar or wheel and sometimes sticks thereto, even when said heating surface is covered with a separating material such as polytetrafluoroethylene and the like. This sticking interferes with the sealing operation and damages the film. The new process is completely free of this very disturbing sticking problem.

The new method can be used to bond together securely certain thermoplastic materials which can not be joined satisfactorily by any conventional heat sealing procedure. For instance, polyethylene surfaces are frequently flame treated or otherwise treated to improve their printability and ink retention characteristics. Such treatment impairs the heat sealability of the polyethylene; and overtreatment is usually scrupulously avoided, since overtreated materials can not be bonded together adequately via standard commercial heat sealing cycles. Such "overtreated" polyethylene sections were bonded together quite satisfactorily, however, by the new method. As a consequence, the treating process becomes less critical and the amount of treatment administered, hence the degree of printability and ink retention improvement accomplished, may be increased to some extent since the limitation imposed by sealability considerations is relieved to some degree by the new sealing technique.

In the drawings:

FIG. 1 is a schematic diagram of apparatus according to, and for carrying out the method of the present invention;

FIG. 2 is a plan view of the seamed films looking in the direction of the arrows 2—2 in FIG. 1;

FIG. 3 is a perspective view of the end of the sealed article with the fused line seal indicated;

Figure 4:
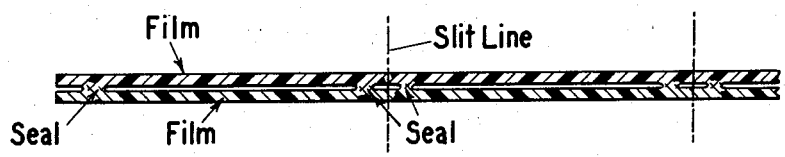
FIG. 4 is a section of two flat unsupported plastic sheets welded together at several points. Dotted lines show positions of slitting for making pouch sealed tubes as a step in pouch or bag making.

Referring to FIG. 1 and using polyethylene film for purposes of illustration, the films 10 and 12 are payed out from feed rolls 14 and 15 and positioned to enter the nip of the driven pinch rolls 16 in the proper overlapping relationship. The extruder 18 provides a continuous, hot bead 20 of polyethylene which is directed between the overlapping portions of the webs 10 and 12, contacts said webs, and sandwiched between them as they enter the nip. As the sandwich passes through the nip, the hot bead 20 is pressed into intimate contact with the inner faces of the overlapped portions of the polyethylene films 10 and 12, transfers sufficient heat to said inner faces to cause them to melt and flux, and all three plies are fused into a single, homogeneous continuum. The bonded product issuing from the nip rolls then passes to a rewind roll 22 or other suitable collecting arrangement.

Figure 5:
FIG. 5 is a section showing sealing of lap seams using this method on unsupported film.
Figure 6:
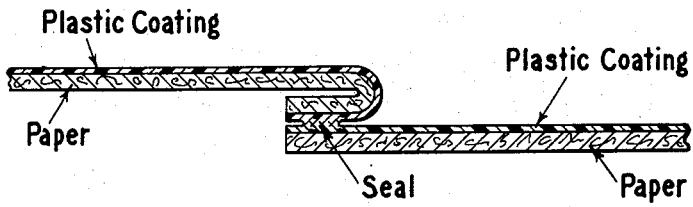
FIG. 6 is a section showing method of sealing coated material to give a continuous inside plastic coating, e.g. in bag making.
Figure 7:
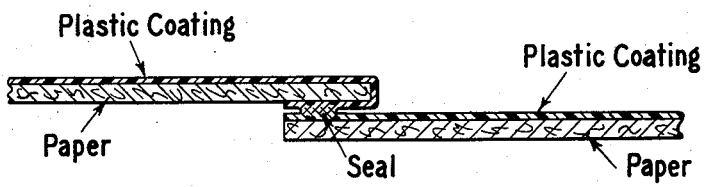
FIG. 7 is a section showing the sealing of lap seams using an edge treated coated material for continuous inside plastic coating, e.g. bag making.
Figure 8:
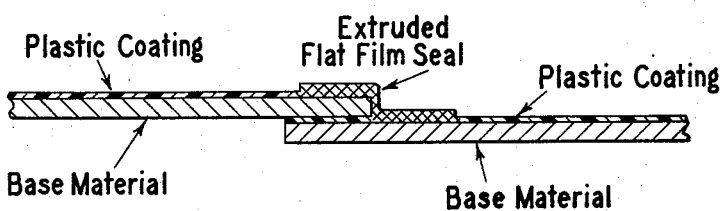
FIG. 8 is a section showing coated material lap welded using flat film extrusion on coated surfaces.
Figure 9:
FIG. 9 is a cross section of end welded heavy unsupported film.

While FIG. 1 shows 10 and 12 as two separate thermoplastic sections, which may be of the same or different thicknesses, they may, with appropriate alterations in the feed and positioning arrangement, represent opposite edges of a single sheet such as would be the case in forming a continuous tube from a flat stock. Still other web arrangements are illustrated in FIGS. 4–9.

Sections of virtually any thickness may be joined by the method of this invention. In actual commercial practice, however, thickness limits are imposed by other considerations. Unsupported films must be thick enough to have the strength needed for handling and use. For polyethylene, this lower limit is about one mil. Above a certain thickness (about 20 mils for polyethylene) the stock can no longer be handled conveniently in roll form or by other continuous methods; but still thicker sections can be sealed by non-continuous versions of this method, e.g., die cut sections may be sealed onto the open ends of a tube to form a container bottom or lid. In supported structures such as polyethylene coated paper, coated cellophane, coated metal foil and the like, minimum coating thickness is about ¼ mil. Most such coatings are less than about 5 mils thick and rarely exceed 10 mil. Such coated or other composite structures can also be sealed advantageously by the new method.

The hot bead 20 may be in the form of one or more thin, narrow films or ribbons, or thin rods or filaments, or may have any other suitable profile and dimensions. The temperature of an extruded bead should be great enough to provide facile extrusion characteristics but not high enough to suffer an excessive degree of thermal injury. For an extruded polyethylene bead, temperatures ranging from about 200 to about 300° C. measured at the extrusion die are generally preferred. The distance between the extruder and the pinch rolls is preferably as short as practical to minimize bead cooling. Even across this short span, however, bead drawdown takes place; and this drawdown can be used to help control seal thickness and width. Relatively lower bead temperatures are preferred when the webs being joined are thin films; and conversely, relatively higher bead temperatures are sometimes advantageous for sealing thicker sections. With respect to the composition of the extrusion material, satisfactory results are usually obtained when it is of the same generic chemical type as the thermoplastic sections being seamed; and an extrusion compound substantially similar in composition to the thermoplastic sections can generally be extruded conveniently over a sufficiently wide range of temperatures and rates to meet most requirements. In some instances, however, it is advantageously modified, i.e., of lower or higher molecular weight, may contain extrusion aids, stabilizers, antioxidants, etc., to permit extrusion at a somewhat lower or higher temperature than might otherwise be practical, improve its extrusion characteristics, increase its stability in the extruder, or otherwise improve its behavior.

The pinch assembly 16 may be located lateral to the extruder 18 as shown in FIG. 1, or more or less directly below it, depending on space and auxiliary equipment requirements. Where such auxiliary equipment requirements or other considerations make it more convenient to increase the distance between the extruder and the pinch rolls, auxiliary heating means can be used to maintain bead temperature over this span. Pinch rolls of both metal and rubberlike composition are satisfactory. The pressure is not particularly critical provided that said pressure is sufficient to provide intimate, firm and continuous contact between the hot bead and both plies. While it is not generally necessary to provide for roll cooling or heating, it is sometimes advantageous to cool the pinch rolls, particularly when thin thermoplastic films are being sealed.

While pressure is generally most conveniently applied by means of a pair of driven pinch or nip rolls such as those referred to above, many alternative means may be used, as for example, matched moving belts, belt and roll combinations, rotating roll and fixed plate combinations, pressure shoes, etc.

Seal width and seal thickness may be varied over a wide range by varying the extrusion die orifice, the extrusion rate and the web speed. Seams as narrow as 0.02" were found to be fully satisfactory and to resist separation under stresses great enough to tear the film itself. It might be pointed out in this respect that reliable seams this narrow can not be prepared consistently by the old sealing methods even by exercising scrupulous control of sealing conditions. Seams up to about 1/16" in width (by old methods) are frequently of marginal quality because of the severity of the seal-edge-weakening inflicted by the heating bar edges. This unfavorable "cutting" effect is not present in the new process because the pressure supplying surfaces are much broader than the seal itself and therefore do not inflict any mechanical damage.

In the following examples, the equipment set up was as shown in FIG. 1.

*Example I*

The extruder (¾" diameter screw) was equipped with a 1/16" diameter filament die. The pinch rolls were a pair of driven, rubber-coated rollers (2.5" diam. x 15" long) and the free filament distance, i.e., the distance from the extrusion die to the nip, was about 6". The films used were commercial extruded films prepared from Bakelite Company's DYNH polyethylene (nominal molecular weight=ca. 23,000; sp. gr.=0.92; melt index=2).

The other details and some measured seam widths are listed below:

| Film Thickness (Mils) | Extrusion Compound | Extrusion Rate (lbs./hr.) | Bead Temp. (° C.) | Web Speed (ft./min.) | Seal Width (mm.) |
|---|---|---|---|---|---|
| 2 | P-2 | 1.93 | 285 | 147 | 0.8 |
| 2 | P-2 | 1.93 | 285 | 328 | 0.7 |
| 2 | P-2 | 1.93 | 285 | 423 | 0.5 |
| 5 | P-1 | 1.51 | 205 | 425 | -------- |
| 5 | P-2 | 3.11 | 260 | 425 | -------- |
| 5 | P-2 | 3.69 | 305 | 133 | 1.7 |
| 5 | P-2 | 3.69 | 305 | 325 | 1.3 |
| 5 | P-2 | 3.69 | 305 | 424 | 1.2 |
| 10 | P-1 | 1.51 | 205 | 425 | -------- |
| 10 | P-1 | 1.86 | 215 | 126 | 2.1 |
| 10 | P-1 | 1.86 | 215 | 296 | 1.4 |
| 10 | P-1 | 1.86 | 215 | 372 | 1.1 |
| 10 | P-2 | 3.11 | 260 | 425 | -------- |

P-1=(a polyethylene having a nominal mol. wt.=ca. 16,000; sp. gr.=0.91; melt index=ca. 10).
P-2=DYNH.
"Bead temp."=temp. of compound at extrusion die.
Web speed of 420-425 ft./min. was maximum rate possible with particular equipment used.

Sections selected at random from the foregoing products were cut normal to the sealing direction and photomicrographs were taken. Each of the seals so viewed appeared as a homogeneous continuum in which the original film plies and bead were completely fused together.

An effort was made to pull the seals apart by means of a tensile tester and by hand. Regardless of the direction of pull relative to the line of seal or of how rapidly or how slowly the pulling force was applied, seal separation was not effected in any instance, even by stresses which caused film failure.

*Example II*

The apparatus used in the previous example was modified as follows. The extruder was equipped with a multi-filament die having five 1/16" diameter circular orifices located on 3/16" centers along a straight line substantially parallel to the bight of the pinch rolls. One of the pinch rolls was replaced by a metal roller.

The extrusion material was an approximately 3:1 mixture of polyethylene compound P-1 (DXM-16) cited in the previous example and a polyethylene having a molecular weight of about 24,000, specific gravity of 0.92, and melt index of 0.3 (Bakelite Company's DYNK). The extrusion rate was about 3 lbs./hr.; and the temperature of the extruded beads at the die lip was 290° C. The following feed stocks were joined as indicated below:

(a) Unbleached, 50 lb. kraft paper and 5 mil thick commercial polyethylene film (same grade cited in previous example), at a web speed of 150 ft./min.;

(b) Two plies of the 5 mil polyethylene film used in (a), at a web speed of 150 ft./min.;

(c) Two plies of the kraft paper used in (a);

(d) Two plies of 60 lb. X-crepe paper (ex Cincinnati Industries, Inc.) which had been coated on one side with a 6 mil layer of polyethylene were joined coated face to coated face at 225 ft./min.; and (e) Two plies of the polyethylene coated X-crepe paper of (d) were joined coated face to uncoated (i.e., paper) face at 165 ft./min.

The seamed products so prepared were tested for seal strength (a) under shear and (b) under tension by pulling the two plies in opposite directions, said directions being (a) substantially normal to the seaming direction (shear) and (b) substantially parallel to the seaming direction, i.e., attempting to "peel" the plies apart (in tension). No seam failure of any sort was detected in any instance. The products of experiments A, C, and in some instances D and E, failed under tension because of paper failure, i.e., the paper fibers pulled apart; but in no case, regardless of the direction or magnitude of the imposed stress, did paper or thermoplastic separate away from the seaming bead.

The invention is advantageous in the use of a hot, polyethylene bead to join unsupported polyethylene sections of any thickness, since the new process is advantageous not only for the relatively thicker sections, say about 2 mils and over, for which conductive heat sealing techniques are marginal to economically unacceptable because of the prohibitively long sealing times required, but also for the relatively thinner sections less than about 2 mils because of the much greater sealing speeds, freedom from seal discontinuities and the elimination of polyethylene-to-sealing equipment sticking.

The new process is equally suitable for joining sections of any extrudable thermoplastic where both plies and the extruded bead are of the same generic chemical family. The new method can also be used to join plies of unlike thermoplastic materials provided said materials and the bead material are sufficiently compatible to fuse together.

Supported thermoplastic webs such as in the form of a coating on paper, cellophane, metal foil, cloth and other substrates, are also within the purview of this invention.

A hot, extruded polyethylene bead can also be used to join two plies of paper, and this technique provides a fast method of bag seaming.

Polyethylene is a superior paper bag adhesive especially when the inner ply of the bags is coated with polyethylene. The low temperature properties of such polyethylene coating greatly improve the bags for shipping of various materials to cold climates.

What is claimed is:

1. Method of sealing together web-like members, which comprises heating and mixing thermoplastic material to bring the same to a homogeneous extrudable condition, extruding said heated material through an extrusion die orifice to form a hot bead, directing said hot bead into contact with said web members at a point spaced from said orifice, causing high speed relative movement between said orifice and said web members, the temperature and speed of extrusion of said bead and the distance from said extrusion die orifice to the point of contact of said extruded bead with said web members being correlated to the speed of said web members to enable said bead to support itself and maintain continuity thereof across said distance, then causing said web members to be pressed firmly and intimately against said hot bead to cause said members to adhere together.

2. Method of sealing together web-like members, which comprises heating and mixing thermoplastic material to bring the same into a homogeneous extrudable condition, extruding said heated material through an extrusion die orifice to form a hot bead, directing said hot bead into contact with said members at a point spaced from said orifice, causing high speed relative movement between said orifice and said members, maintaining the temperature and speed of extrusion of said bead and the distance from said extrusion die orifice to the point of contact with said members and the speed of said web members in excess of the speed of extrusion all sufficient to cause drawdown of said bead as it traverses said distance, then causing said members to be pressed firmly and intimately against said hot bead to cause said members to adhere together.

3. Method of sealing together strips of material, which comprises passing said strips along converging paths into the nip of pinch rolls, directing a hot narrow bead of thermoplastic resin composition directly between said strips ahead of the nip of said pinch rolls and extending longitudinally parallel to and laterally spaced inwardly from one of the side edges of said strips, cooling said rolls, passing said strips with said narrow bead therebetween on through said cooled nip to bring said strips into firm and intimate contact with the hot narrow bead to cool and harden the same and thereby cause said strips to adhere together and maintaining the temperature and speed of extrusion of said bead and the distance from the point of extrusion to the point of contact with said strips to enable said bead to support itself and maintain continuity thereof across said distance.

4. Method of producing strips of material joined together along a longitudinal seam intermediate their respective side edges, which comprises passing said strips along converging paths into laterally overlapping pressure contact of only their side margins with each other, leaving the lateral remainder of said strips of single thickness free of any overlap, extruding a hot narrow bead of thermoplastic material between said converging paths to pass between said overlapping side margins of said strips as they contact under pressure to apply hot thermoplastic material to only narrow bands of said overlapping side margins, leaving the remainder thereof free of any thermoplastic application, said pressure contact flattening said bead and spreading it laterally over said narrow bands without overlapping the remainder of said overlapping side margins, to cause said flattened and spread bead to adhere to only said registering narrow bands without adhering to the remainder of said side margins and maintaining the temperature and speed of extrusion of said bead and the distance from the point of extrusion to the point of contact with said strips and the speed of said strips in excess of the speed of extrusion all sufficient to cause drawdown of said bead as it traverses said distance.

5. Method as claimed in claim 1, wherein the thermoplastic extruded material is a polyethylene composition.

6. Method as claimed in claim 1, wherein at least one of the web members is paper.

7. Method as claimed in claim 1, wherein at least one of the web members has a thermoplastic surface.

References Cited in the file of this patent

UNITED STATES PATENTS

| | | |
|---|---|---|
| 1,125,445 | Beadle | Jan. 19, 1915 |
| 1,980,119 | Wait | Nov. 6, 1934 |
| 2,468,629 | Herzig et al. | Apr. 26, 1949 |
| 2,606,850 | Piazze | Aug. 12, 1952 |
| 2,708,278 | Kamborian | May 17, 1955 |
| 2,714,571 | Irion et al. | Aug. 2, 1955 |
| 2,715,088 | Gunning | Aug. 9, 1955 |
| 2,722,263 | Beare et al. | Nov. 1, 1955 |
| 2,722,964 | Duncan | Nov. 8, 1955 |
| 2,767,769 | Hasselquist | Oct. 23, 1956 |
| 2,782,140 | Vaughan | Feb. 19, 1957 |
| 2,815,308 | Robinson et al. | Dec. 3, 1957 |
| 2,914,108 | Coakley | Nov. 24, 1959 |
| 2,926,723 | Clark | Mar. 1, 1960 |